(12) United States Patent
Glöckler

(10) Patent No.: US 8,047,562 B2
(45) Date of Patent: Nov. 1, 2011

(54) GENERATOR ASSEMBLY FOR AN AIRBAG MODULE OF A MOTOR VEHICLE

(75) Inventor: Oliver Glöckler, Nersingen (DE)

(73) Assignee: Takata-Petri AG, Aschaffenburg (DE)

( * ) Notice: Subject to any disclaimer, the term of this patent is extended or adjusted under 35 U.S.C. 154(b) by 53 days.

(21) Appl. No.: 12/448,196

(22) PCT Filed: Nov. 21, 2007

(86) PCT No.: PCT/EP2007/062627
§ 371 (c)(1),
(2), (4) Date: Jul. 29, 2009

(87) PCT Pub. No.: WO2008/071525
PCT Pub. Date: Jun. 19, 2008

(65) Prior Publication Data
US 2009/0302586 A1 Dec. 10, 2009

(30) Foreign Application Priority Data
Dec. 15, 2006 (DE) .................. 20 2006 019 196 U

(51) Int. Cl.
*B60R 21/20* (2006.01)
(52) U.S. Cl. ............... 280/728.2; 280/736; 280/730.2
(58) Field of Classification Search ............. 280/730.2, 280/728.2, 736, 741; 102/530, 531
See application file for complete search history.

(56) References Cited

U.S. PATENT DOCUMENTS

| | | | |
|---|---|---|---|
| 6,056,319 A * | 5/2000 | Ruckdeschel et al. | 280/741 |
| 6,224,089 B1 | 5/2001 | Uchiyama et al. | |
| 6,666,721 B1 | 12/2003 | Jakob et al. | |
| 2002/0135160 A1 | 9/2002 | Lorenz | |
| 2005/0225063 A1 | 10/2005 | Schaupp et al. | |
| 2005/0253364 A1 | 11/2005 | Wallentin et al. | |
| 2006/0006630 A1 | 1/2006 | Schwarz | |
| 2006/0087105 A1 | 4/2006 | Retallick et al. | |
| 2008/0111351 A1 | 5/2008 | Eckert et al. | |
| 2008/0111357 A1 | 5/2008 | Heninger et al. | |
| 2008/0238044 A1 * | 10/2008 | Wagener et al. | 280/728.2 |

FOREIGN PATENT DOCUMENTS

| | | |
|---|---|---|
| DE | 199 44 052 A1 | 3/2000 |
| DE | 198 46 110 A1 | 4/2000 |
| DE | 101 14 208 A1 | 5/2002 |
| DE | 102 34 502 A1 | 7/2003 |
| DE | 202 20 428 U1 | 7/2003 |
| DE | 20 2004 016 975 U1 | 12/2004 |
| DE | 103 57 867 A1 | 7/2005 |
| DE | 10 2004 015 755 B3 | 9/2005 |
| DE | 20 2005 011 878 U1 | 10/2005 |

(Continued)

*Primary Examiner* — Ruth Ilan
(74) *Attorney, Agent, or Firm* — Foley & Lardner LLP

(57) ABSTRACT

A generator assembly for an airbag module of a motor vehicle is provided. The generator assembly comprising a gas generator for inflating an airbag of an airbag module with gas, wherein the gas generator defines with its generator housing a lateral surface that extends between a first and a second frontal cover surface of the gas generator, and means for electrically insulating the gas generator with respect to adjacent parts. For electrical insulation of the gas generator a flexible material layer is provided that completely covers the lateral surface of the gas generator. A systematic, defined grounding of the gas generator via a grounding conductor is carried out which is connected to an electrical connection of the gas generator that is integrated into a connector area of the gas generator.

19 Claims, 2 Drawing Sheets

FOREIGN PATENT DOCUMENTS

| | | |
|---|---|---|
| DE | 10 2005 031 108 A1 | 1/2006 |
| DE | 20 2006 002 871 U1 | 5/2006 |
| DE | 10 2005 004 452 A1 | 8/2006 |
| EP | 1 453 705 B1 | 9/2004 |
| EP | 1 511 659 B1 | 3/2005 |
| EP | 1 511 660 B1 | 3/2005 |
| EP | 1 559 620 A1 | 8/2005 |
| EP | 1 686 020 A1 | 8/2006 |
| WO | WO 02/00476 A1 | 1/2002 |
| WO | WO 03/049978 A1 | 6/2003 |
| WO | WO 03/101789 A1 | 12/2003 |
| WO | WO 03/104042 A1 | 12/2003 |

* cited by examiner

GENERATOR ASSEMBLY FOR AN AIRBAG MODULE OF A MOTOR VEHICLE

CROSS-REFERENCE TO A RELATED APPLICATION

This application is a National Phase Patent Application of International Patent Application Number PCT/EP2007/062627, filed on Nov. 21, 2007, which claims priority of German Utility Model Application Number 20 2006 019 196.8, filed on Dec. 15, 2006.

BACKGROUND

The invention relates to a generator assembly of an airbag module of a motor vehicle.

Such a generator assembly comprises a gas generator for inflating an airbag comprising an airbag covering of the airbag module with gas and means for electrically insulating the gas generator (comprising a metallic housing) with respect to adjacent (metallic) parts of the airbag module.

An airbag module for which the mentioned generator assembly can be used, serves for protection of occupants in case of a crash. For this, the gas generator of the airbag module is coupled to one or several crash and/or pre-crash sensors which upon a strong deceleration caused by a crash or rather upon an imminent crash detected by means of sensor data cause an ignition of the gas generator so that the latter discharges gas for inflating the airbag. The airbag that is initially provided in a folded or rather gathered state in the airbag module deploys upon inflation and forms a gas cushion in the inflated state that shall protect one or several occupants from a collision with the vehicle body.

In order to activate the gas generator in case of a crash detected by sensors provided therefor, the gas generator is usually electrically, i.e., via electrical conductors, connected to a control device that causes an ignition of the gas generator due to corresponding sensor signals.

In many applications one thereby seeks to electrically insulate the gas generator, i.e., particularly a metallic housing of the gas generator, with respect to adjacent (metallic) parts, so that a necessary grounding of the gas generator takes place exclusively systematically. Regarding insulating a gas generator with respect to surrounding parts it is known to form mounting parts and fastening elements that are in contact with the gas generator and particularly its (metallic) housing in an electrically insulating manner and to provide them for instance with molded plastic areas. This however causes an increased effort concerning production and necessitates the use of complicated mounting parts and fastening elements.

SUMMARY

Therefore, the problem underlying the invention is to provide a generator assembly of the afore-mentioned kind that stands out due to a reliable electrical insulation having a simple design at the same time.

According to an exemplary embodiment of the invention to an exemplary embodiment of the invention, a flexible material layer is provided for electrical insulation of the gas generator, particularly in form of a fabric layer that surrounds the gas generator along a circumferential direction (at an outer side of the gas generator), particularly advantageously enclosing the gas generator along the circumferential direction completely.

Due to the gas generator being surrounded by a flexible material layer on its outer side formed by a (metallic) housing, the direct contact of adjacent (metallic) parts with the gas generator is avoided, since the flexible material layer shields the gas generator with respect to such contact by residing between the outer side of the gas generator formed by the (metallic) generator housing and other parts adjacent thereto.

Depending on the installation position of the gas generator in an airbag module, particularly depending on where in the airbag module metallic parts are provided that are in contact or may come in contact with the outer side of the gas generator, the gas generator is partially or completely surrounded along the circumferential direction by the flexible material layer. An embodiment is advantageous in which the flexible material layer forms a flexible covering that surrounds the gas generator in the circumferential direction, which flexible covering can be slid onto the gas generator for example.

The arrangement according to an exemplary embodiment of the invention for insulating a gas generator is for instance suited for use in gas generators which extend along an axis as for instance a so called tubular gas generator that comprises an essentially cylindrical lateral surface that extends between a first and a second frontal cover surface. In such a case (in case of an intended arrangement of the associated gas generator) a covering out of a flexible material forming a hollow cylinder that is open at least one cover surface can be slid onto the gas generator in a simple manner.

A maximum protection of the gas generator from electrical contact to adjacent parts is achieved in case the flexible material layer or the covering extends along the longitudinal axis of the gas generator essentially along the entire length of the gas generator, so that the lateral surface of the gas generator is covered by the flexible material layer along its complete length (thus completely).

The flexible material layer can be on the one hand a section of the airbag that is to be inflated by the gas generator, for instance by forming a section (extension) of the airbag in such a manner that said section surrounds the gas generator for insulation with respect to neighbouring parts. This arrangement is to be differentiated from the known case that a gas generator is arranged inside an airbag that is to be inflated by the gas generator. Since in the latter case the airbag surrounding the gas generator does not serve for electrical insulation of the gas generator with respect to neighbouring metallic parts. It is crucial for the flexible material layer according to the present invention that said flexible material layer tightly encloses or rather butts against the gas generator in order to protect it from direct contact to adjacent parts even in case the airbag is inflated in case of a crash and thereby deploys. I.e., the flexible material layer surrounds the cross section of the gas generator (permanently, i.e. even upon inflation of the airbag) essentially concentrically and the flexible material layer preserves upon inflation of the airbag its original spatial position (on the outer side of the gas generator) without deploying or rather substantially moving away from the gas generator (especially from the outer side of the gas generator facing the flexible material layer), so that a hollow space defined by the flexible material layer is essentially filled completely by the gas generator.

On the other hand, the flexible material layer insulating the gas generator with respect to its surrounding can be a separate layer with respect to the airbag, which layer is not connected to the airbag that is to be inflated. In this way, the flexible material layer can form a component of a casing that surrounds the airbag in a folded state. Such casing serves for housing the airbag folded to an airbag package or rather the gathered airbag, in order to simplify the stowage of the airbag package in the motor vehicle. Such a casing of the airbag can consist of a film for instance that tears apart upon inflation and deployment of the airbag.

It is however also possible that the flexible material layer that insulates the gas generator with respect to its surrounding does not form an element of another component of the airbag module, but is provided as a discrete module component.

Exemplary, the flexible material layer serves for avoiding a direct contact of the surface (outer side) of the gas generator with components of a retaining device via which the gas generator is connected to an associated supporting motor vehicle part in order to fix its position in the motor vehicle, wherein the supporting motor vehicle part may also be a component of the airbag module, for example a housing part of the airbag module. For this, the flexible material layer extends between the gas generator and the retaining device so that a direct contact of the gas generator with the associated retaining device which due to stability reasons usually consists of metal is avoided.

The retaining device can comprise for instance a clamping section that at least partially encloses the gas generator which clamping section is clamped to the gas generator by means of associated clamping elements, wherein the flexible material layer extends between the clamping section of the retaining device and the outer side of the gas generator.

The grounding of a gas generator that is electrically insulated with respect to surrounding parts in this way can occur by means of a grounding conductor that contacts a (multipolar) connector area of the gas generator, which connector area also serves for ignition of the gas generator by means of sensor-controlled electrical signals.

BRIEF DESCRIPTION OF THE DRAWINGS

Further details and advantages of the invention are clarified by means of the following description of embodiments with reference to the Figures.

It is shown in.

DETAILED DESCRIPTION

Figure 1:
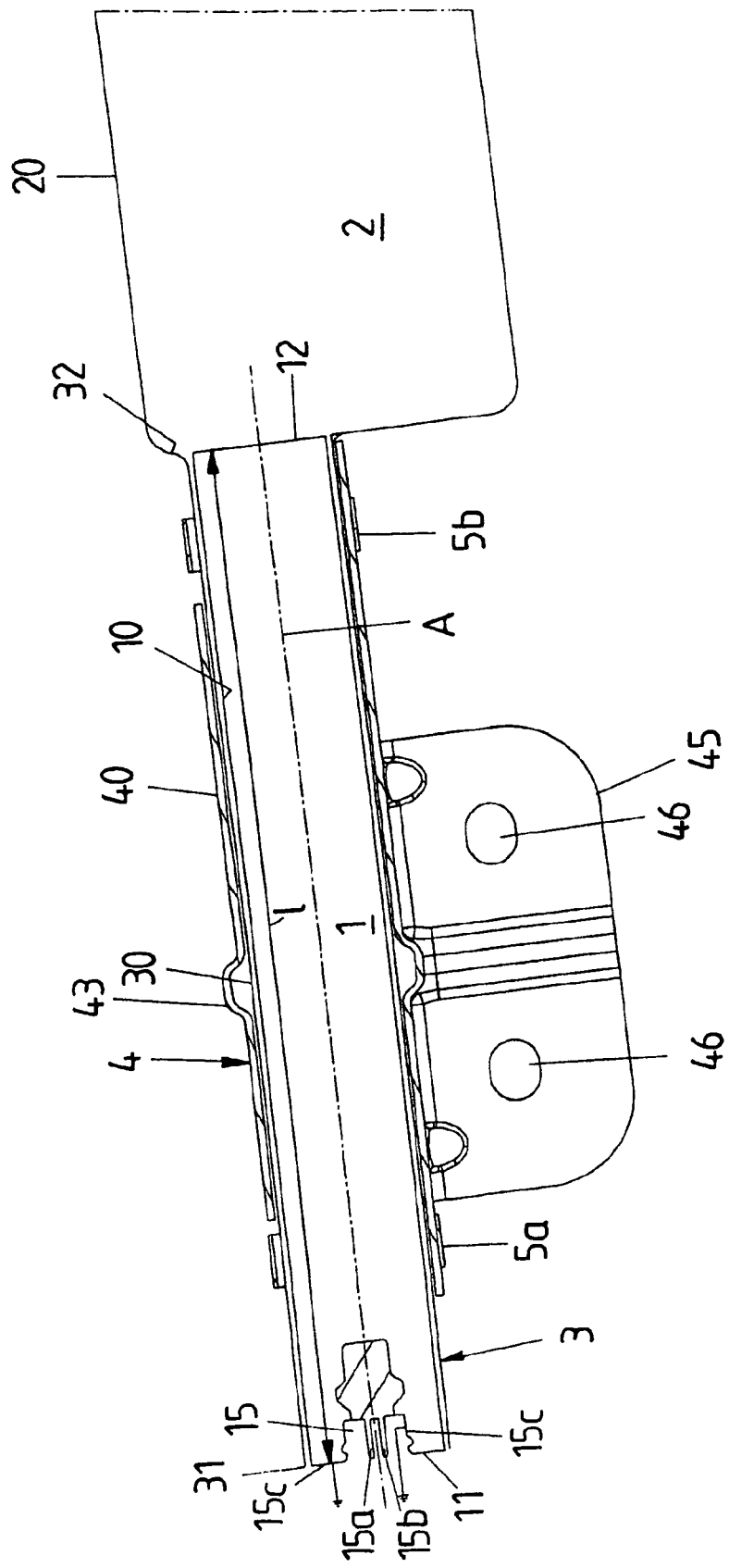
FIG. 1 a cross section through a generator assembly of an airbag module for a motor vehicle.

In FIG. 1 a gas generator 1, an airbag 2 that is to be inflated by the gas generator in case of a crash having an airbag covering 20, a fabric layer 3 for electrically insulating the gas generator 1, as well as a retaining device 4 associated to the gas generator 1 of an airbag module for a motor vehicle are depicted.

The gas generator 1 can be a so called tubular gas generator which is surrounded by a tubular, essentially hollow cylindrical metallic housing 10 which extends with this generator housing 10 defining a cylindrical lateral surface of length l between a first frontal cover surface 11 and a second frontal cover surface 12 along an axis A.

The gas generator 1 serves for inflation of an associated airbag 2 in case of a crash by filling the covering 20 of the airbag 2 (airbag covering) with gas by means of the gas generator 1. The airbag 2 thereby exemplary resides in the present case in front of the second frontal cover surface 12 of the gas generator 1.

From the airbag 2 an airbag section 3 formed as an extension protrudes in the direction of the gas generator 1 which forms a flexible protection covering 30 enclosing the gas generator 1 which, like the airbag covering 20, consists of a fabric or, to be more precise, is formed together with the airbag covering 20 out of a suitable (uniform) fabric.

The flexible protection covering 30 forming the extension 3 of the airbag 2 extends, like the (tubular) gas generator 1, between a first cover surface 31 and a second cover surface 32, wherein the first (open) cover surface 31 of the flexible protection covering 30 surrounds the first frontal cover surface 11 of the gas generator 1 and the second (also open) cover surface 32 of the flexible protection covering 30 butts against the second frontal cover surface 12 of the gas generator 1 and forms an intersection to the airbag covering 20.

Concretely, the flexible protection covering 30 of the gas generator 1 is an essentially hollow cylindrical extension of the airbag 2, such that the airbag covering 20 and the flexible protection covering 30 form a common hollow space and the area of this hollow space that is enclosed by the airbag covering 20 serves for filling with gas while the area of this hollow space that is enclosed by the flexible protection covering 30 serves for housing the gas generator 1, wherein the flexible protection covering 30 tightly encloses the gas generator housing 10 such that the flexible protection covering 30 butts against the gas generator housing 10.

Hereby, the gas generator 1 or rather its housing 10 is electrically insulated with respect to adjacent (metallic) parts. This particularly holds for components of a retaining device 4 via which the gas generator 1 can be fixed in a motor vehicle in a defined position.

The retaining device 4 comprises a clamping section 40 that encloses the gas generator 1 in a ring-shaped manner under an angle of less than 360°, however preferably under an angle of at least 180°, which clamping section 40 is clamped to the gas generator 1 or, to be more precise, to its housing 10 by means of two clamping elements 5a, 5b in the form of clamping rings. Thereby, the flexible covering 30 enclosing the gas generator 1 extends between the housing 10 of the gas generator 1 on the one hand and said components 5a, 5b, 40 of the retaining device 4 on the other hand, so that these parts typically consisting of metal have no direct contact with the metallic gas generator housing 10.

The clamping section 40 of the retaining device 4 comprises in addition a ring-shaped circumferential protrusion 43 into which a bead of the generator housing 10 can engage in order to secure the clamping section 40 in the axial direction (along the longitudinal axis A of the gas generator 1).

From the clamping section 40 of the retaining device 4 a connecting section 45 protrudes via which the gas generator 1 clamped in the clamping section 40 of the retaining device 4 can be fixed to a supporting part of the motor vehicle wherefore fastening openings 46 are provided in the connecting section 45 which fastening openings 46 are engaged by suitable fastening elements for instance in the form of screws.

Since the flexible protection covering 30 is adapted in its cross section to the outer contour of the gas generator 1 that faces the flexible protection covering 30 and the retaining device 4 encloses the gas generator 1 as well as the flexible covering 30 with its clamping section 40 in a clamping manner, the flexible covering 30 butts against the gas generator 1, to be more precise, against its outer side formed by the generator housing 10, so that the flexible protection covering 30 is essentially completely filled by the gas generator 1 even in case the airbag covering 20 is filled with gas upon inflation of the airbag 2.

The gas generator 1 comprises at its first frontal covering surface 11 facing away from the airbag 2 a connector area 15 that allows for an electric connection of a control device by means of which the gas generator 1 can be activated or ignited depending on output signals of a single or several crash or pre-crash sensors. Hereto, electrical connecting conductors (electrical wires) are provided that electrically connect the control device associated to gas generator 1 in a known manner to the gas generator 1, and which electrical connecting conductors are to be connected via connector elements to the connector area 15 of the gas generator 1.

The connector area 15 of the gas generator 1 can be a multipolar connector area to which, besides the electrical connecting conductors to the associated controlling device, also grounding conductors can be connected, in order to ground the gas generator. Hereby, in combination with the insulation of the gas generator 1 the systematic, defined grounding of the gas generator 1 is achieved by means of the flexible protection covering 30.

Concretely, the connector area 15 of the gas generator 1 at hand comprises three connector elements 15a, 15b, 15c, of which two connector elements 15a, 15b, in the form of connector pins, are provided for an electric connection of the gas generator 1 to an associated control device (via electrical connecting conductors) and a further connector element 15c is provided for grounding the gas generator 1 via the grounding conductor that is to be connected to said connector element 15c and extends therefrom, which grounding conductor is lead to a central vehicle grounding. For this, the third connector element 15c is in contact with the (metallic) gas generator housing 10 and can be formed for instance by an electric contact section of the inner wall of the connector area 15 and/or at its front side. Both variants are indicated in FIG. 1.

Figure 2:
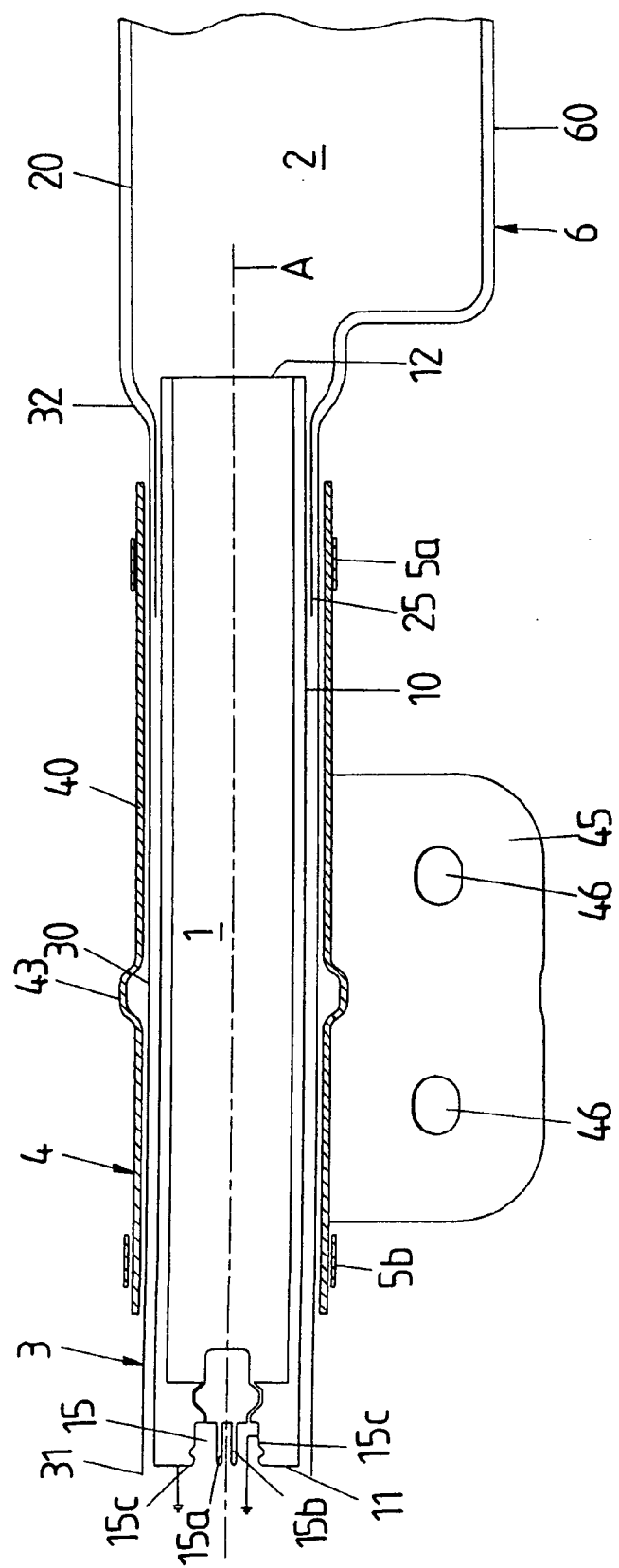
FIG. 2 a modification of the generator assembly of FIG. 1 in a cross section.

In FIG. 2 a modification of the embodiment shown in FIG. 1 is depicted, wherein a difference consists in that according to FIG. 2 the airbag 2 is surrounded in a state in which the airbag 2 is folded to an airbag package or in which it is gathered by a casing 6 formed by a film 60. The latter fixes the airbag 2 in the state in which the airbag is compressed to a package and therefore simplifies the stowage of the airbag 2 in a motor vehicle.

Upon inflation of the airbag 2 in case of a crash by filling the inner space of the airbag 2 surrounded by the airbag covering 20 with gas, wherein the airbag 2 deploys, the casing 6 formed by the film 60 tears open, so that the airbag 2 can leave the casing 6 and can form the gas cushion serving for protecting an occupant.

A further difference to the embodiment shown in FIG. 1 consists in case of a generator assembly according to FIG. 1 in that the flexible protection covering 30 serving for insulating the gas generator 1 with respect to neighbouring parts is not formed by an extension of the airbag 2 that can be inflated to form a gas cushion in case of a crash, but moreover by an extension 3 of the casing 6 that surrounds the airbag 2 in the compressed state. I.e., the extension 3 is (integrally) connected to the film 60 forming the casing 6, so that it is preferentially formed as a film part 2, and protrudes from said film 60 towards the gas generator 2. Thereby, an intersection area to the casing 6 of the airbag 6 or, to be more precise, to the film 60 forming this casing 6 is formed at the second frontal cover surface 32 of the flexible covering 30.

In this case, the airbag 2 or rather the airbag covering 20 surrounds the gas generator 1 with an inlet port 25 of the airbag 2 merely in sections in the area of its frontal cover surface 12 facing the airbag 2.

The afore-described electrical insulation of the gas generator 1 with respect to neighbouring parts is independent from the fact, whether the gas generator is a hot gas generator which upon ignition (chemically) generates hot gases out of a mixture for inflation of the airbag 2, or a cold gas generator which upon ignition discharges a gas already stored in the gas generator for inflation of the airbag 2, or a so called hybrid gas generator which contains a stored gas dischargeable for inflation of the airbag 2, as well as a mixture serving for generating additional hot gases.

The invention claimed is:

1. A generator assembly for an airbag module of a motor vehicle, comprising:
   a gas generator for inflating an airbag of the airbag module with gas, wherein the gas generator defines with its generator housing a lateral surface that extends between a first frontal cover surface and a second frontal cover surface of the gas generator,
   a flexible material layer for electrically insulating the gas generator with respect adjacent parts, the flexible material layer being provided such that the flexible material layer completely covers the lateral surface of the gas generator,
   wherein the flexible material layer is formed by a section of the airbag,
   wherein a systematic defined grounding of the gas generator via a grounding conductor is carried out which is connected to an electrical connection of the gas generator that is integrated into a connector area of the gas generator, and
   wherein, upon inflation of the airbag, the flexible material layer retains its spatial position in front of an outer side of the gas generator facing the flexible material layer.

2. The generator assembly according to claim 1, wherein the flexible material layer in a form of a flexible covering encloses the gas generator along a circumferential direction.

3. The generator assembly according to claim 2, wherein the flexible covering defines a hollow cylinder.

4. The generator assembly according to claim 2, wherein the flexible covering extends between two opposing front faces each defining a cover surface, wherein at least one of the two cover surfaces is an open cover surface.

5. The generator assembly according to claim 1, wherein the gas generator extends along an axis.

6. The generator assembly according to claim 5, wherein the flexible material layer extends in a direction of the generator axis essentially along an entire length of the gas generator.

7. The generator assembly according to claim 1, wherein the flexible material layer is formed by an extension of the airbag.

8. The generator assembly according to claim 1, wherein the flexible material layer defines a hollow space together with the airbag, the hollow space comprising a first hollow space area that is filled with gas upon inflation of the airbag, and a second hollow space area, wherein the second hollow space area is enclosed by the flexible material layer and is essentially completely filled by the gas generator.

9. The generator assembly according claim 1, wherein the airbag and/or the flexible material layer consist of a fabric.

10. The generator assembly according to claim 1, wherein a retaining device is associated to the gas generator, wherein the retaining device is configured to fix the gas generator to an associated motor vehicle part.

11. The generator assembly according to claim 1, wherein the connector area of the gas generator is configured to be connected to an electrical connecting conductor in order to be able to electrically activate the gas generator so that the gas generator discharges gas for inflating the airbag.

12. The generator assembly according to claim 1, wherein the electrical connection stands in electrical contact to the housing of the gas generator, and wherein the housing of the gas generator is metallic.

13. A generator assembly for an airbag module of a motor vehicle, comprising:
- a gas generator for inflating an airbag of the airbag module with gas, wherein the gas generator defines with its generator housing a lateral surface that extends between a first frontal cover surface and a second frontal cover surface of the gas generator, and
- a flexible material layer for electrically insulating the gas generator with respect to adjacent parts, the flexible material layer being provided such that the flexible material layer completely covers the lateral surface of the gas generator,
- wherein a systematic, defined grounding of the gas generator via a grounding conductor is carried out which is connected to an electrical connection of the gas generator that is integrated into a connector area of the gas generator,
- wherein the airbag is compressed to form an airbag package prior to inflation and is surrounded by a casing, and
- wherein the flexible material layer is formed by a section of the casing.

14. The generator assembly according to claim 13, wherein the casing of the airbag consists of a film material.

15. The generator assembly according to claim 13, wherein, upon inflation of the airbag, the flexible material layer retains its spatial position in front of an outer side of the gas generator facing the flexible material layer.

16. The generator assembly according to claim 13, wherein the flexible material layer defines a hollow space together with the airbag, the hollow space comprising a first hollow space area that is filled with gas upon inflation of the airbag, and a second hollow space area, and wherein the second hollow space area is enclosed by the flexible material layer and is essentially completely filled by the gas generator.

17. The generator assembly according to claim 13, wherein a retaining device is associated to the gas generator, and wherein the retaining device is configured to fix the gas generator to an associated motor vehicle part.

18. The generator assembly according to claim 13, wherein the connector area of the gas generator is configured to be connected to an electrical connecting conductor in order to be able to electrically activate the gas generator so that the gas generator discharges gas for inflating the airbag.

19. The generator assembly according to claim 13, wherein the electrical connection stands in electrical contact to the housing of the gas generator, and wherein the housing of the gas generator is metallic.

* * * * *